Oct. 11, 1932.  J. T. WELCH  1,882,463
ARTIFICIAL BAIT
Filed Dec. 2, 1929
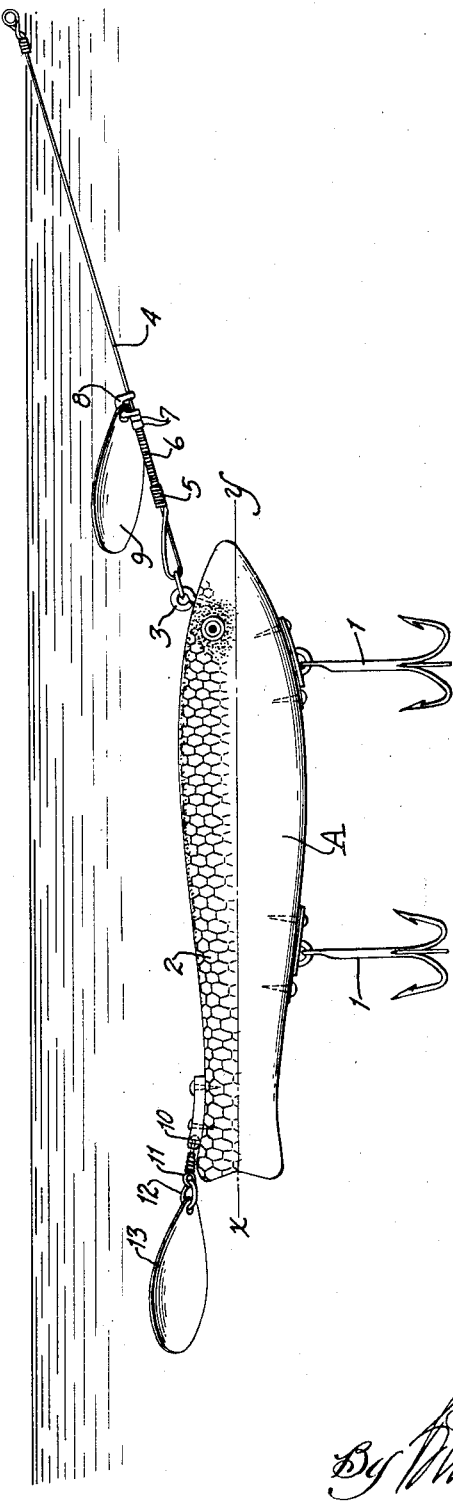
Inventor:
Jack T. Welch,
By Whinney & Whinney
Attys.

Patented Oct. 11, 1932

1,882,463

UNITED STATES PATENT OFFICE

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN

ARTIFICIAL BAIT

Application filed December 2, 1929. Serial No. 410,996.

This invention relates to a sub-surface artificial bait, and is particularly concerned with means by which to prevent rotation of the bait during its travel through the water. In an under-water bait, particularly such as is formed of material having a greater specific gravity than water, there is a marked tendency for the bait to turn over while being retrieved. By the means herein disclosed, this undesirable tendency is definitely checked.

A suggestive exemplification of this invention is set forth in the accompanying drawing which illustrates in side elevation a sub-surface artificial bait equipped with means by which to prevent its rotation.

The bait herein shown comprises a body A in the general form of a minnow with one or more gang hooks 1 depending from its belly. The present bait may desirably be made from pyralin which is a substance having a specific gravity somewhat greater than water. To such a material, which lends itself admirably to the purpose of an artificial bait, a decorative or scale finish 2 may be applied to its surface, as is suggested in the drawing.

An eye 3 is secured to the forward end of the bait, preferably on the upper side of its nose so as to be disposed at a point which is both high and forwardly. Connected to this eye is a leader 4 to which a line is secured in the usual way. This leader, preferably of wire, has a coil 5 near its rear end forming an abutment for a sliding sleeve 6 adjacent the forward end of which is a pair of collars 7. Mounted to slide and rotate on the leader is a clip 8 forming a connector by which a spoon 9 is carried on the leader. This spoon which lies to one side of the leader is free to shift its rotative position thereupon by a turning movement of the clip. The normal position of the spoon is toward the rear end of the leader, the clip then lying next to the proximate collar 7 which is held away from the bait by the sleeve 6 and leader portion to the rear thereof.

Along the top edge of the bait at its rear end is secured a tail plate 10 to which is swivelly connected an eye 11. As by means of a ring 12 in connection with this eye, a trailing spoon 13 is carried by the bait. The position of this spoon is normally to the rear of the bait and above its center of gravity which is indicated by the line $x$—$y$.

In the use of the present under-water bait both spoons will exert a force which tends to oppose rotation of the bait. In accomplishing this result, both spoons are disposed above the central line of gravity of the bait and are connected thereto at points relatively close to its top edge, one at the forward end and the other at the rear end thereof. The revolving action of both spoons exerts a stabilizing force upon the bait at the points where connection is made therewith, and this is effective to overcome any tendency which the bait otherwise would have to revolve while being retrieved through the water.

In baits which are bouyant, it is customary to weight the body in its lowest portion so as to prevent any revolving movement while traveling through the water. With a bait whose specific gravity is greater than water, such an expedient is not effective. It is only by provding a stabilizing force offset with respect to one side of the central line of gravity of the bait that the latter will be prevented from executing the usual rotary movements. In the present construction I accomplish this result by attaching to the bait in its upper region front and rear spoons adapted to revolve as the bait is retrieved, thereby setting up a force which is adequate to counteract the revolving tendency of the bait.

I claim:

1. A fish bait having a minnow-like body with specific gravity greater than water, a leader connected to a forward upper portion of the bait, and a spoon mounted to revolve about the leader above the central line of gravity of the bait.

2. A fish bait having a minnow-like body with specific gravity greater than water, an eye rearwardly of the bait swivelly connected thereto at the rear upper portion thereof, and a spoon in connection with the eye for rotation above the central line of gravity of the bait.

3. A sub-surface fish bait having a body to which are connected revolvable stabilizing elements, one forwardly and one rearwardly of the bait, the axis of rotation of said elements being located adjacent the upper surface of the body and said elements being swiveled to revolve through paths lying normally above the central line of gravity of the bait body during retrieving movements thereof.

4. A fish bait having a body portion of greater specific gravity than water and which normally tends to revolve when retrieved, a fish hook depending from said body portion, and a water actuated stabilizing element mounted positively on the upper rear surface of the body portion, the field of rotation of said element being normally above the central line of gravity of the body during retrieving movements thereof.

5. A fish bait of greater specific gravity than water and which normally tends to revolve when retrieved, and a water actuated stabilizing element mounted positively to the bait adjacent the upper rear surface thereof and having its body portion operable in a field normally above the central line of gravity of the bait during retrieving movement thereof.

In testimony whereof, I have hereunto set my hand and affixed my seal this 26th day of November, 1929.

JACK T. WELCH.